United States Patent [19]
Peter

[11] Patent Number: 5,921,142
[45] Date of Patent: Jul. 13, 1999

[54] ZERO TURN TRACTOR CONTROL SYSTEM

[75] Inventor: Tim Peter, Medina, Ohio

[73] Assignee: MTD Products Inc., Cleveland, Ohio

[21] Appl. No.: 08/679,101

[22] Filed: Jul. 12, 1996

[51] Int. Cl.⁶ .............................. G05G 1/24; F16F 9/00
[52] U.S. Cl. .............................. 74/491; 74/470; 267/150
[58] Field of Search ....................... 74/470, 491; 267/150

[56] References Cited

U.S. PATENT DOCUMENTS

| | | | |
|---|---|---|---|
| 2,593,643 | 4/1952 | Woolf | 74/470 X |
| 2,998,211 | 8/1961 | Evans | 74/470 XP |
| 3,792,744 | 2/1974 | Gray | 74/491 X |
| 3,990,320 | 11/1976 | Habiger | 74/473 |
| 4,406,473 | 9/1983 | Sexton | 267/150 X |
| 4,589,249 | 5/1986 | Walker et al. | 56/16.6 |
| 4,600,075 | 7/1986 | Heidner et al. | 180/336 |
| 5,427,216 | 6/1995 | Hoch | 192/4 |

*Primary Examiner*—Allan D. Herrman
*Attorney, Agent, or Firm*—Emerson & Associates; Rodger D. Emerson; Timothy D. Bennett

[57] ABSTRACT

A neutral biasing system is disclosed using a neutral biased biasing system on a control column to bias a remote power unit into a neutral condition.

15 Claims, 7 Drawing Sheets

ZERO TURN TRACTOR CONTROL SYSTEM

FIELD OF THE INVENTION

This invention relates to a control system for a ground care device and more particularly, in the preferred embodiment, a zero turn ride on tractor.

BACKGROUND OF THE INVENTION

Modern ground care devices typically have some sort of engine powered wheel drives which are under the selective control of a control system. Typically in consumer devices, this control system comprises two direction speed foot pedals and a steering wheel while in the more heavy duty commercial devices, there are two long handled pivoting arms. In either device, the speed and direction of the ground care device depends on the direction and amount of movement of one or all of the controls. The operator is thus able to control the movement of the ground care device. While functional, typically there is some sort of complicated interconnect system between the controls and the power units as well as some settable neutral biasing system in order to insure a quiescent state for the device. In addition frequently the settable neutral biasing system is located at the power unit, thus requiring the intervening control linkages be strong enough to both operate the power unit as well as overcoming the biasing force of the neutral system, a biasing force typically greater than that necessary to operate the power unit.

OBJECTS AND SUMMARY OF THE INVENTION

It is an object of the present invention to provide for a simplified control system for ground care equipment.

It is another object of the present invention to simplify the construction of control systems for ground care equipment.

It is yet another object of the present invention to reduce the physical size of control systems.

It is still another object of the present invention to reduce the complexity of control systems.

It is a further object of the present invention to lower the cost of control systems and associated power transmissions.

Other objects and a more complete understanding of the invention may be had by referring to the drawings in which:

BRIEF DESCRIPTION OF THE DRAWINGS

The structure, operation, and advantages of the presently disclosed preferred embodiment of the invention will become apparent upon consideration of the following description taken in conjunction with the accompanying drawings wherein.

DETAILED DESCRIPTION OF THE INVENTION

Figure 1:
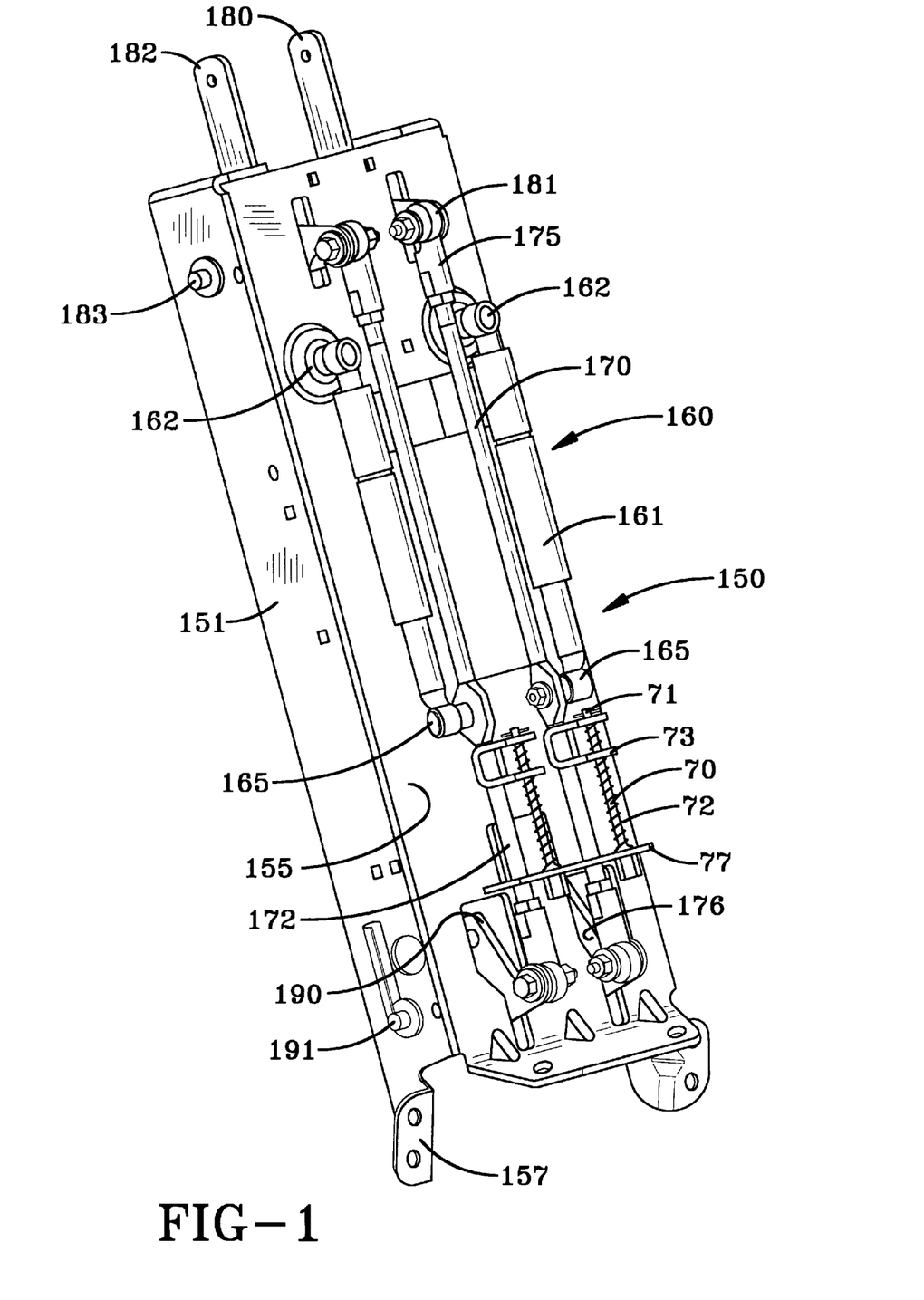
FIG. 1 is a perspective view of a control system incorporating the invention of the application.
Figure 2:
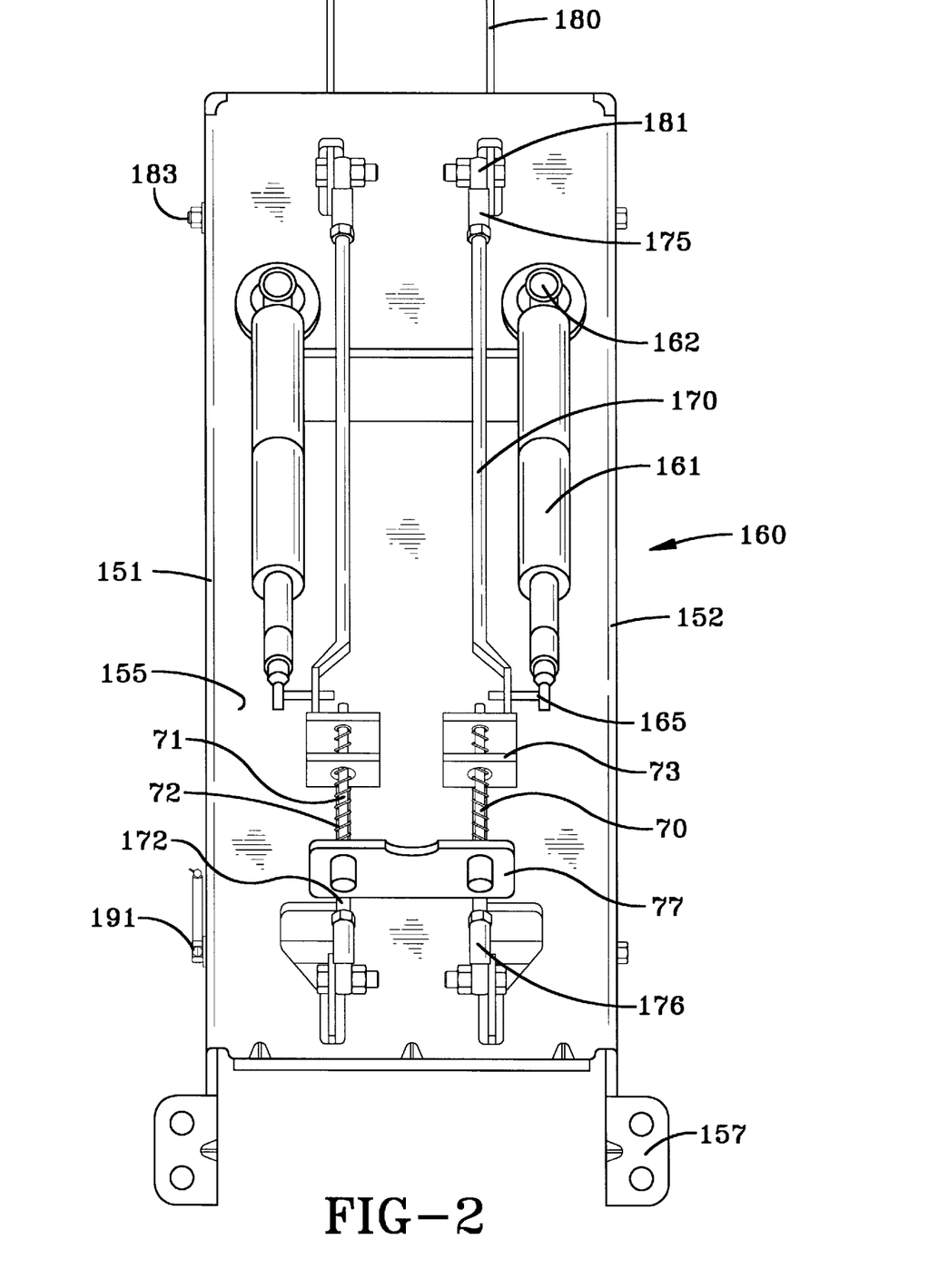
FIG. 2 is a front view of the control system of FIG. 1.
Figure 3:
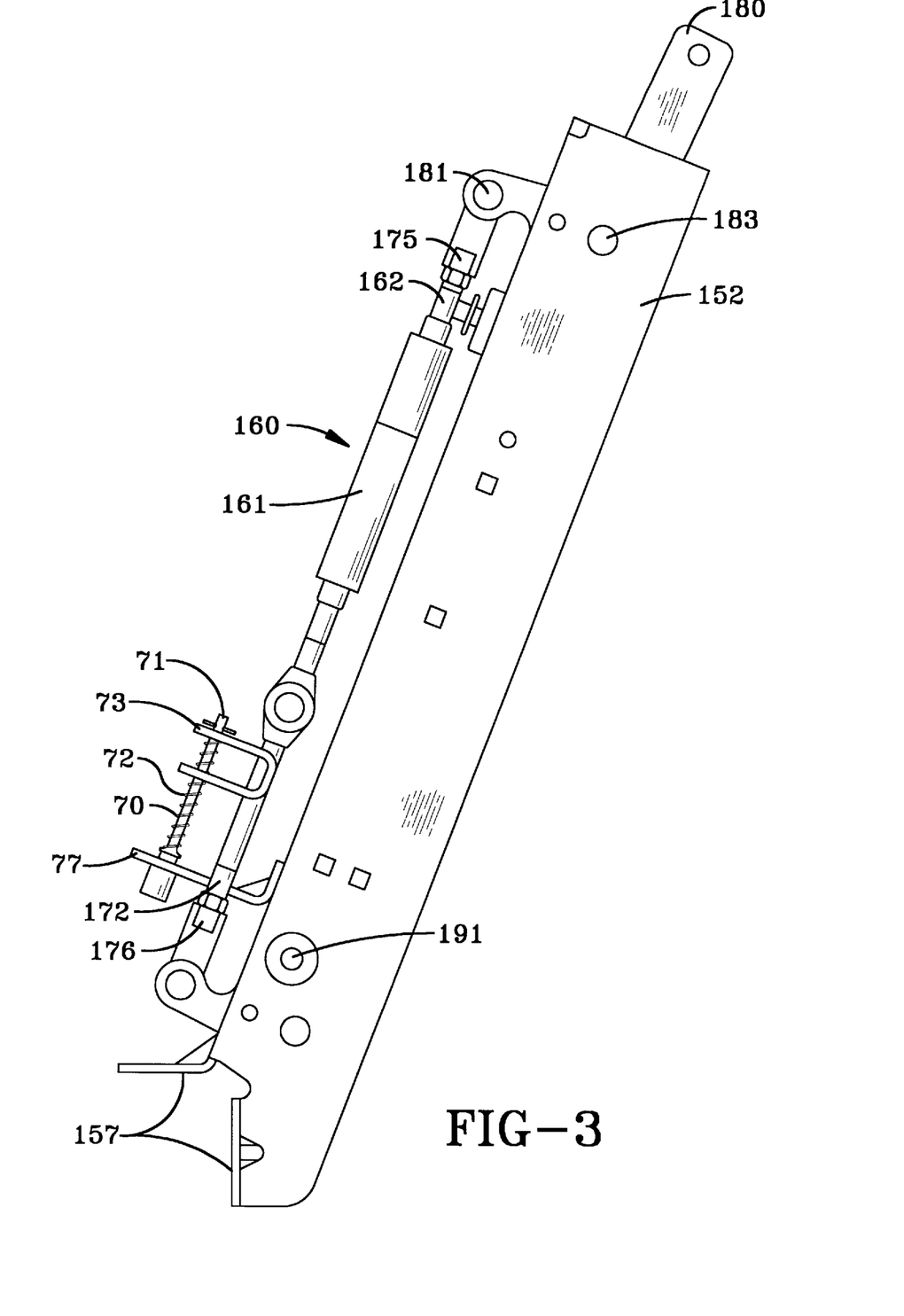
FIG. 3 is a side view of the control system of FIG. 1.
Figure 4:
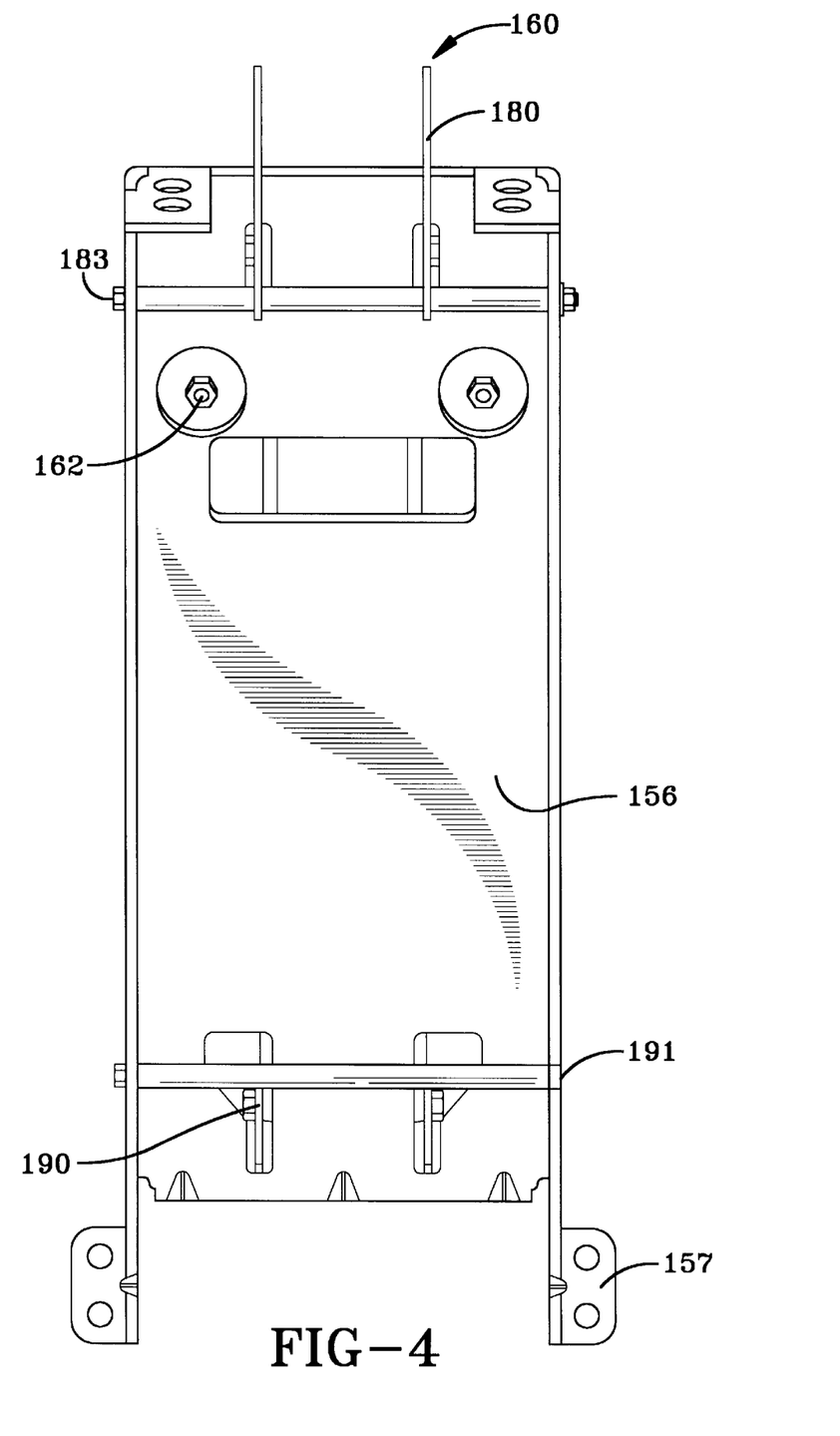
FIG. 4 is a back view of the control system of FIG. 1.
Figure 5:
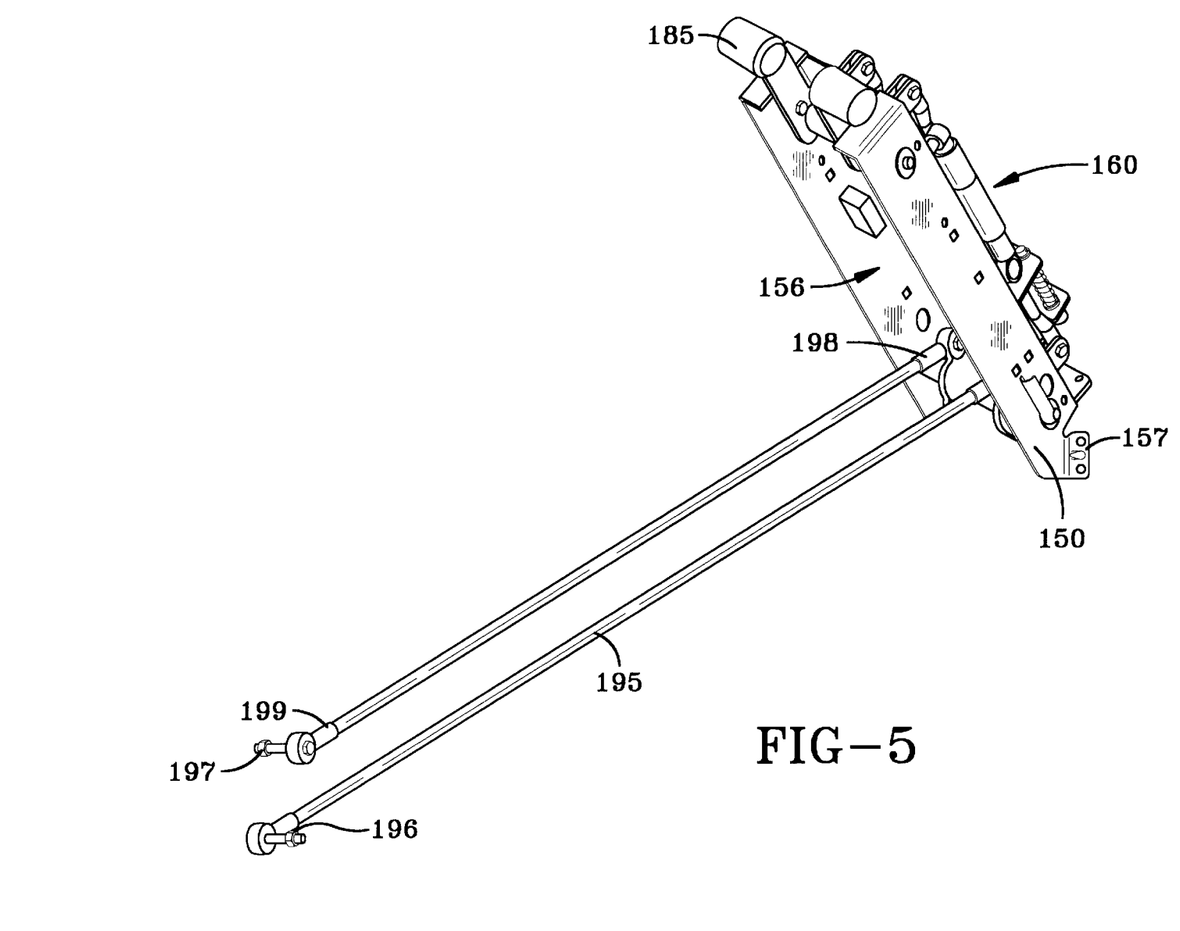
FIG. 5 is a back perspective view of the control system of figure 1 complete with handles and secondary control rods.
Figure 6:
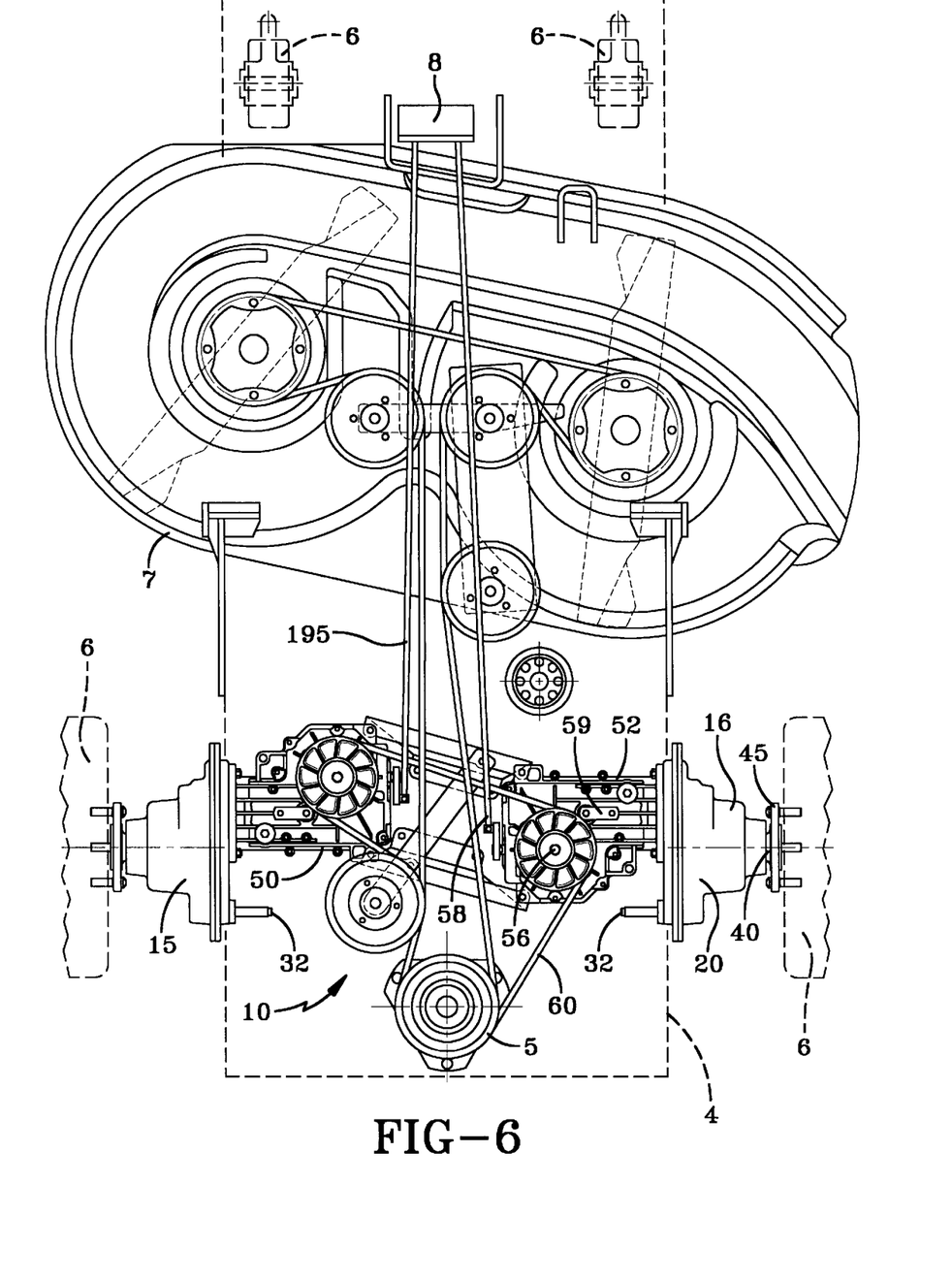
FIG. 6 is a plain view of a representative drive system for use with the control system of FIG. 1; and, FIG. 7 is a perspective view like FIG. 1 of an alternate embodiment.

The control system of this invention is designed for use with a ground care device. This ground care device has a frame for controlled travel over a lawn or other grounds. This device may be a riding mower, a walk behind mower, a tractor, a utility vehicle or other device utilized in grounds care. As the particular nature of the device is unnecessary for appreciation of the applicant's invention, these devices are represented by a zero turn tractor found in partial representational form (FIG. 6). This includes in representation form body rails 4, an engine 5, wheels 6, a driven or carried tool 7 (twin bladed mower with clutch shown), and controls 9 (speed/direction, brake, engine speed, and mower shown). The front wheels 6 shown are pivoted to a laterally angularly floating front axle assembly so as to track the direction of movement of the device with the minimum stress.

The direction and speed of the ground care device is under the control of a drive system having a settable neutral position. This drive system can include belt drive systems, gear systems, hydraulic systems, and/or combinations thereof. The systems can provide single direction, single speeds through multiple direction, infinite speeds. The mechanical gear shift on the fly drive system of U.S. Pat. No. 5,408,896 entitled Power Transmission Drive System, with or without a multiple speed final drive, would be particularly suitable.

The invention will be described in conjunction with an asymmetrical drive system 10 that includes a final ratio 15 (planetary reduction drive shown), and a power unit 50 (Model # BDR-301 hydrostatic transmission from AGRI-FAB shown).

The final ratio 15 as shown combines the purposes of providing a speed reduction function in addition to mounting the wheel and power unit onto the body rails of the grounds care unit.

The preferred final ratio 15 is mounted in mirror image form as a pair of otherwise identical drives. The drive system further includes a way for compensating for the otherwise differing direction rotation of the wheels should this type of drive be connected to a motor rotating in a single direction. The planetary reduction drive 15 itself includes an outer case or housing 16, a planetary reduction gear system 20, and an output shaft 40.

The outer case 16 serves to mount the various other elements of the planetary reduction drive 15 together in relation to each other. In the preferred embodiment disclosed, the outer case in addition serves to rotatively mount the rear drive wheels 6 to the body rails 4, provides a brake, and assists in mounting the later described power unit to the frame. The outer case in addition serves to contain the lubricant for the reduction drive.

The planetary reduction system 20 reduces the speed of the later described power unit to that which is more suitable for driving a device across the grounds. The planetary reduction gear system itself includes a spur gear input shaft, an internal gear, a sun gear, a multiplicity of planetary spur gears, and an output carriage assembly.

The spur gear input shaft takes the rotary power of the later described power unit and mechanically interconnects it to a gear on the inside of the internal gear. In the preferred embodiment disclosed, this provides a substantially 3.643 to 1 speed reduction.

The internal gear itself drives a sun gear rotatively mounted to the output shaft by needle bearings. The output carriage assembly is axially aligned with the center of the output shaft 40 surrounding same. A series of four further planetary spur gears are located between the sun gear and a further internal gear fixed to the outer case by pins so as to rotate the output carriage assembly through pins. This interconnects the planetary gear reduction system 20 to the wheels for drivingly interengaging same through an additional 3.3 to 1 reduction ratio (total reduction is 12.021 to 1 reduction ratio).

The output shaft 40 itself is mounted to the outer case 16 of the reduction system by an inner ball bearing and an outer ball bearing. An oil seal immediately adjacent to the outer ball bearing ensures that the lubricant inside the planetary gear reduction system 20 does not escape to the atmosphere. Due to the inclusion of angular loads, the outer ball bearing is preferably larger than the inner ball bearing.

The wheel mounting disk 45 with integral lugs on the outside of the planetary gear reduction system allows such system to be selectively interconnected to a wheel. Due to the fact that the planetary reduction drive 15 is itself fixedly interconnected to the frame of the grounds care device (by a bolt to the later described frame interconnect arm and mounting bracket), the bearings are in addition physically supported to the ground care device on the wheels, this in addition to the wheel drive previously explained.

A brake shaft 32 forces a brake shoe against the outside diameter of the internal gear (through a cam) so as to provide for the selective braking of the wheel.

A power unit 50 is interconnected to the final ratio in order to provide the rotative power therefor.

In the particular preferred embodiment disclosed, this power unit 50 is an L drive hydrostatic power unit made by AGRIFAB and marketed under Model # BDR-301. This hydrostatic power unit has a case 52. This case 52 serves to contain the movable parts of the hydraulic unit as well as serving to mount the hydrostatic unit onto the outer case 16 of the planetary reduction system 20 (by flange). The hydrostatic power unit 50 in addition includes a pump input shaft 56, a motor output shaft (within case 16), and a direction speed control 58.

The pump input shaft 56 is used to interconnect the hydrostatic unit to a motor. Due to the invention of the particular application, this is easily accomplished by a single drive belt 60. This pump input shaft 56 is typically rotated in a single direction. In the preferred embodiment disclosed, the pump of the hydrostatic unit has an output of 10 ccs per revolution.

The motor output shaft provides the output power for the hydrostatic unit 50. In the preferred embodiment disclosed, this is accomplished by mounting the spur gear input shaft of the planetary reduction system 20 directly on the motor shaft. A boss with an O ring closely surrounding the motor shaft seals the outer case 16 at this location in order to allow for the hydrostatic unit to be mounted on the planetary gear reduction system in a detachable manner without leaks.

Because the motor connected to the output shaft has a capacity of some 21 ccs per revolution of the output shaft, this hydrostatic unit in addition provides a substantially 2.1 to 1 reduction in speed input to output, thus further serving to increase the torque available for the final ratio 15.

The speed and direction of the motor output shaft of the hydrostatic power unit is under control of a direction and speed control 58. At the substantially neutral position (FIG. 6), the motor output shaft is quiescent. If the speed and direction control 58 is moved angularly clockwise, an output shaft will rotate in one direction, with RPMs increasing upon increasing angular deflection from the neutral position shown. Movement of the direction speed control 58 counterclockwise will cause the motor output shaft to rotate in the other direction, again with RPMs increasing upon increased angular movement of the control 58. Thus the rotation of the wheel mounting disk 45 is directly under the control of this hydrostatic direction and speed control 58.

A dump valve 59 is preferably located on the hydrostatic transmission so as to allow the wheels to free-wheel. This would allow movement of the grounds care device without operating the engine and/or damaging the components thereof.

The particular power unit 50 and final ratios 15 are asymmetric (FIG. 6). This presents both complications and advantages. A tremendous advantage of this asymmetric orientation is that by reorienting the components in respect to each other, power units can be provided for both lateral sides of the grounds care device utilizing the same identical physical components. This substantially halves the inventory requirements for a manufacturer and/or repair dealer while also at the same time paradoxically simplifying the control systems for the device (example shown in FIG. 6). By rotating the final drive 15 substantially 180° about a line perpendicular to the output shaft 40, a substantially mirror image of the final drive 15 is present between the opposite lateral sides of the grounds care device. At the same time this is occurring, the power unit 50, disconnected from the final drive 15, is rotated substantially 180° around the pump shaft 56 before being bolted onto the second asymmetric final drive (contrast the pump unit clearance bulge 63 of the hydrostatic transmission 50 on the left side of 53 with the same component on the right side of FIG. 6). This power unit orientation causes the motors on opposite sides of the device to rotate in opposite directions (the motor on one side rotating clockwise for forward movement of the wheels while the other motor rotates counterclockwise for the same forward movement).

With this orientation the reversing of the direction of the power units 50 cancel each other out. By this it is meant that upon movement of the control lever 58 forward on either side of the device that particular wheel drive will power the unit in the same direction. Further, this is accomplished merely by making one of the control rods which interconnects the direction and speed control lever 58 to the associated controls approximately 3" longer at this particular location. Substantially all other parts of any dual controls can be identical between the two sides. Further, the single belt 60 interconnecting the respective power unit 50 to the motor can be short and simple (as shown in FIG. 6) with no concern over the need to compensate for the asymmetric units.

There is also a mounting bracket 8 for the control system fixedly connected to the body rails 4. When the control system of the present invention is mounted onto the bracket 8 and interconnected to the power unit control levers, the speed and direction of the ground care device is directly under the control of the control system by an operator sitting on top of the frame just ahead of the lateral axis of the two output shafts.

In the preferred embodiment disclosed, the bracket 8 is mounted to the body rails at the front of the ground care unit (shown as 8 in representational form in FIG. 6).

The invention of this present invention relates to a control system for a grounds care system wherein preferably the neutral biasing mechanism and control dampener are located remotely from the power unit in close association with the respective controls. Due to this location the control system can directly manipulate the neutral biasing mechanism with the subsequent connections only passing sufficient force to place the power unit into neutral. This reduces the forces and attendant wear on these subsequent connections. Further any wear between the controls and neutral biasing mechanism will not compromise the bias of the power unit to neutral. Further since most of the parts of the control system are located in a location protected from contaminants (grass clippings, dirt, etc.), the weather, physical injury, and otherwards greater longevity is occasioned. Note that in the preferred embodiment most of the parts of the control system are located mounted to the control column. This includes the neutral biasing mechanism for the transmission as well as the control dampener. This modular construction eases manufacture and repair as well as minimizing the number of parts. In addition since both sides of the system are virtually identical, inventory is significantly reduced.

Note that this self contained assembly could be located remotely of both the control system and power unit to provide for an integral return to neutral dampener system.

The control system itself includes a frame 150, a neutral biasing system 160, a control rod assembly 170, a control 180, and an interconnection 190 to the power unit FIGS. 1–5).

The frame 150 is designed to retain the operative parts of the control system in appropriate positions in respect to each other and in addition to the body rails 4 of the ground care device.

The particular frame 150 disclosed is a stamped metal structure having a substantially U shaped cross section with two side plates 151, 152, a front surface 155, a back cavity 156, and a set of mounting brackets 157.

The side plates 151, 152 add structural rigidity to the front surface 155 in addition to providing a location for the later described pivot points. Other reinforcements and mounts could also be utilized.

The front surface 155 serves to mount the neutral biasing system 160 onto the frame 150.

The back cavity 156 serves as a location for the later described pivots and control levers as well as providing a location for auxiliary controls such as throttle, blade clutch, parking brake, and the like.

The neutral biasing system 160 is the main resilience, neutral biasing mechanism for the control system.

The neutral biasing spring provides for a neutral biasing mechanism by, in combination with the later described other connector 190, serving to bias then retain the control levers 58 of the power units into predefined pre-adjusted neutral positions.

The dampener provides for the resilience for the later described control levers by providing a resistance for movement of such control levers from a predefined neutral position.

The particular system disclosed combines both by using a spring loaded pneumatic cylinder 161 mounted between pivot points 162, 165 to the frame 150 and the later described control rod 170 respectively. Note that the 90° relative displacement between the axis of the two pivot points 162, 165 provides for a convenient, strong, and easily accessible location for the cylinder 161.

The particular pneumatic cylinder 161 is the AVM Self-centering Bi-directional Damper sold by AVM, Inc. of Marion, S.C. This device generally contains a bi-directional piston in a cylinder co-centrically surrounded by a single neutral biasing spring, itself inside a dust cover. The spring serves to bias the piston into a known centered location while the piston cooperates with the surrounding cylinder and small bleed bypass holes so as to dampen any movement changing the length of the cylinder between the two pivot points 162, 165. This serves to provide a known neutral positioning for the mechanism. It also provides a quality, low vibration feel/feedback to the operator.

The assembly has no direct impediments on the control rods 170 and as such that the control rods can move in respect thereto subject to the existence of the guides in the cylinder.

The control rods 170 aid in interconnecting the system to the power unit.

The particular control rods 170 are straight with a substantially longitudinal linear movement. Alternate movements could be used, such as pivoting, circular, angular, etc.

One end of the control rods 170 is interconnected to a selectively operated control 180 while the other end of the control rods is interconnected to a power unit. The location and nature of these interconnections can vary depending on the actual control, actual drive system, and actual interconnection.

In the preferred embodiment disclosed, the upper end 171 of the control rods is interconnected to an outwardly protruding section 181 of an L shaped control lever 180 by an adjustable ball fitting 175. The control lever 180 itself is mounted via a control arm pivot 183 to the side plates 151, 152 of the frame 150. With this interconnection, the independent forward and backward movement of the upper section 182 of the control levers 180 causes the upward and downward movements of the control rods 170 respectively as earlier explained. Control handles 185 are interconnected to the upper extending lever sections in the preferred embodiment to facilitate this movement.

The lower end 172 of the control rods 170 are interconnected by adjustable ball joints 176 to bell cranks 190, which bell cranks are interconnected by a directional pivot 191 to the side plates 151, 152 of the frame 150. With this orientation, the independent upward and downward movement of the bell cranks 190 is translated into forward and aft movement of a series of control rods 195 respectively, themselves interconnected to the control levers 58 of the power units. A lower adjustable ball 176 allows for the relative positioning of the bell cranks 190 to be selectively adjusted in respect to the control rods 170.

The power rods 195 interconnect the control system to the power unit.

The particular power rods 195 are again straight with a substantially longitudinal linear movement. Alternate movements could be used, such as pivoting, circular, angular, etc.

The ends 196, 197 of the power unit rods 195 are interconnected respectively to the control levers 58 of the right and left side power units. Thus any movement of the power unit rods 195 operates the drive system—allowing for a zero radius turn in the ground care unit disclosed. Note that since the power units are asymmetrical both provide the same drive direction for similar movement of the control handles 185. It is only necessary that one power unit rod 195 be slightly longer than the other—one of the few unidentical parts between right and left sides in the entire control/drive system.

Adjustable ball joints 198, 199 allow for the length of the power unit rods 195 to be adjusted.

In the preferred embodiment disclosed the control power unit rods 195 extend angularly between the control system and the power units (shown in FIG. 6). This simplifies this interconnection.

The whole system also reduces the tolerances that have to be kept by reducing the number of intervening movable joints between the pivot 162 connection to the frame 150 and the connection of the ends 196, 197 of the power unit rods 195 to the control lever 58. This allows the neutral biasing system 160 for the power units 50 to be mounted remotely therefrom. Indeed in the preferred embodiment disclosed the dampener system 160 is located adjacent to the controls 180 and then further on the main control column frame. In addition since the biasing system 160 operates on a longitudinally moving rod, substantially equal forces are present through the length of control movement. Also most of the critical components for the control system are also available upon simple removal of the control column cover, thus facilitating repair. Note that by locating most of the moving parts of the control system in the column, the problems of foreign contamination, heat, physical damage, and such are also minimized.

Note that in the preferred embodiment disclosed a cutout mechanism 70 is provided between the rods 170 to a bracket fixedly connected to the top surface 155 of the frame 150. This cutout mechanism 70 is designed to contact switches (not shown) on the brackets so as to operate same for some desired purpose—in the preferred embodiment shown to disable the cutting action of the mower deck on initiation of reverse.

The preferred cutout mechanism disclosed utilizes a movable pin 71, which pin 71 can be moved relatively upwards in respect to a flange 73 against the force of the spring 72. Since the pin 71 is moved away from the bracket when the rod 170 is moved upwards, no action is provided. However when the rod 170 is moved downward the ends of the pins 71 contact the switches in the brackets so as to operate same, in the preferred embodiment cut off power to the electric blade clutch on the engine shaft. The spring 72 provides for an overtravel so as to provide this operation through full control travel.

In the preferred control system disclosed the biasing system 160 is not adjustable (i.e. the length of the cylinder 161 is a predetermined distance). When installed on the machine the neutral position is thus adjusted so that the neutral of the machine is in the same place as the cylinder 161.

The preferred initial setup of the control system disclosed is therefor to adjust the relative dimensions between the lower ends 172 of the control rods 170 and the control levers 58 of the power units so as to match neutral of the transmission to neutral of the biasing system 160. In the preferred system this could technically be accomplished by adjusting one or more of: a) the adjustable balls 176 between the lower end 172 of the control rods 170 and the bell cranks 190, b) the adjustable balls 198 between the power unit rods 195 and the bell cranks 190, and/or c) the adjustable balls 196, 197 between the power unit rods 195 and the transmission control levers 58.

When installing the biasing system on the machine the neutral position is adjusted so that the neutral on the machine is the concurrent with that of the biasing system. This locks in the neutral relationship between the neutral biasing system 160 and the power unit 50 such that upon release of the control levers 180, the power unit will be pulled back to neutral position by the neutral biasing system 160.

It is preferred that the adjustable ball 176 be adjusted to center the bell crank 190. It is further preferred that subsequently bell crank 190 be pinned in this position and the relative length of the power unit rods 195 be changed by adjusting either or one of the adjustable balls 198, 196, and 197—the choice depending on the length of adjustability than available at either end. This allows for a symmetry of force and travel between both sides.

Thereafter it is preferred that the last step of the adjustment be to alter the adjustable balls 175 between the upper end 171 of the control rods and the control levers 180 in order to place the control handles 185 in the desired neutral position. This provides a positive tactile feedback to the operator as well as insuring that the neutral position of both control handles 185 correspond to each other, thus to provide a more intuitive control for the device.

Alternately the setting may be accomplished by pinning one of the upper levers 180 or lower levers 190 in a centered position and adjusting the rods to match this position with the biasing system in neutral and then to adjust the other of the control levers 180 or 190 to its control neutral position. Thereafter adjusting the lengths of the rods 195 to match the power unit neutral to that of the control system.

Figure 7:
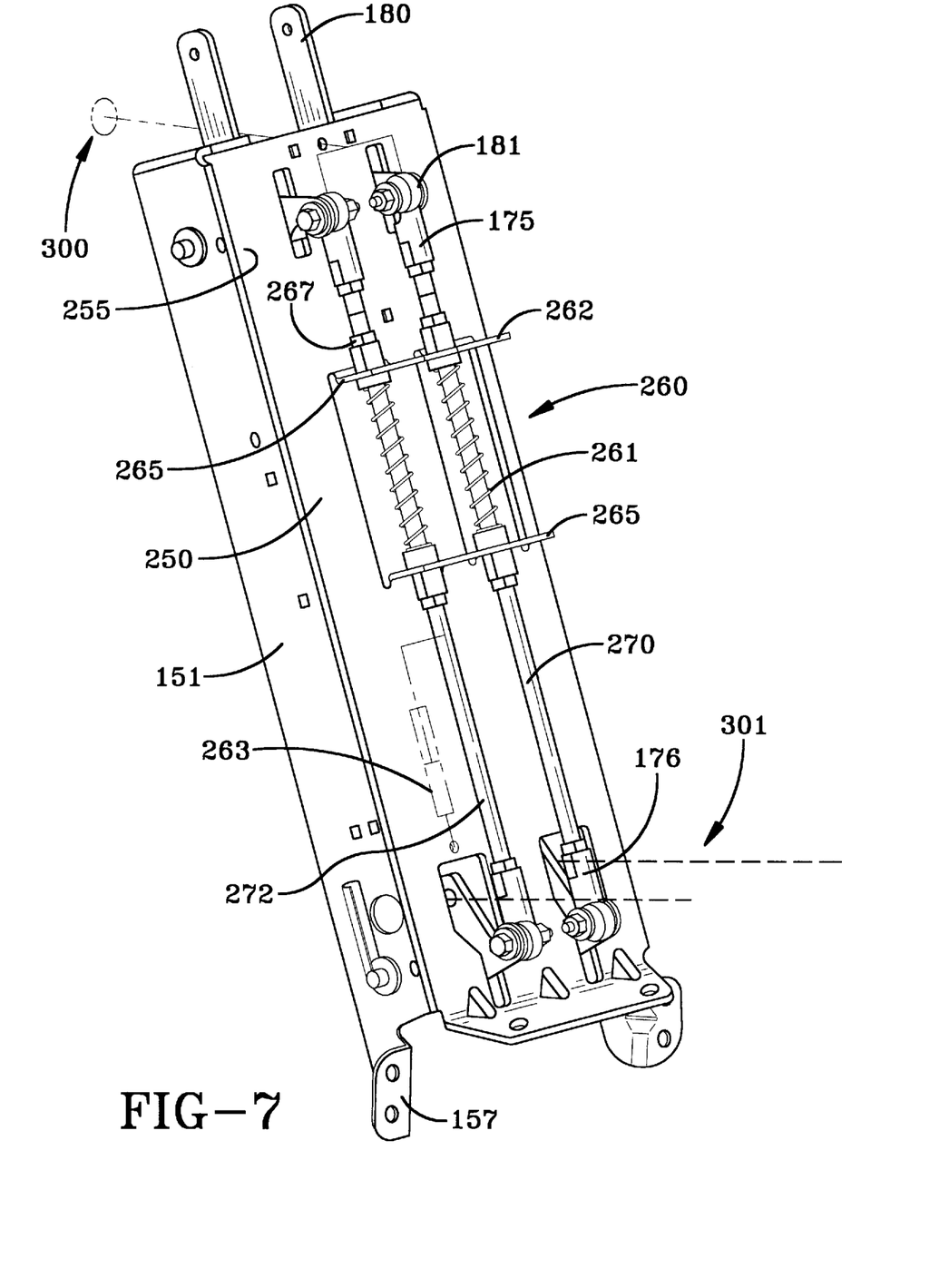

Although the invention has been described in its preferred embodiment with a certain degree of particularity, it is to be understood that numerous changes can be made without deviating from the invention as hereinafter claimed. For example, other neutral biasing mechanism and movement dampeners could be utilized. Examples include two spring central connection neutral biasing mechanisms, rotary neutral biasing mechanisms, matched pair offset neutral biasing systems, friction plate dampeners, hydraulic dampeners, etc. An alternate neutral biasing system specifically disclosed could be springs 261 located between two guides 262, which guides 262 themselves extend through flanges 265 (FIG. 7). The flanges in turn are fixedly interconnected to the front surface 255 of the frame 250. Note that since the preferred springs 261 extend uninterrupted for the full distance between the guides 262, a longer travel and a smoother more linear operation is produced. Alternately, a single solid connection to the center of the spring 261 or between two half length springs could be used.

The guides 262 and springs 261 have no direct impediments in the center thereof, which condition allows for the control rods 270 to be slideably inserted through the guides 262 and springs 261 such that the control rods can freely slide in respect thereto subject to the existence of stops 266 and adjustment nuts 267 on the control rod 270 on either side of the guides 262.

The stops 266 are preferably fixedly connected to the control rods respectively immediately below the lower guide 262 such that upon movement of the control rod 270 in an upward direction, the lower guide 262 is displaced upwardly against the pressure of the springs 261. Similarly, the adjustment nut 267 is preferably located immediately above the upper guide 262 such that on downward movement of the control rod, the upper guide 262 is displaced downwardly against the spring 261. In both operations, the combination of guides and springs serve to return the control rod 270 to its predefined initial position upon release of the appropriate control lever.

In this respect, it is noted that the distance between the adjustment nut 267 and the stop 266 on the control rod is preferably set such that the upper and lower guides 262 have little or no clearance to their respective flanges 265 when the neutral biasing system 260 is in its initial neutral position. This serves to accurately and reliably position the control rods 270 in respect to the remainder of the device, thus locking in a known neutral condition to the control system.

A separate bi-directional dampener would be located somewhere on the main operative parts of the control system 250 between the controls 180 and control lever 58 so as to smooth out vibrations and provide a quality control action. An example location would be a linear bi-directional pneumatic cylinder between the control rod 172 and the frame 150 (shown in representational form as 263 in respect to but one control rod 272 in FIG. 7). If appropriate a bi-directional rotary dampener could also be utilized. A location near to the controls 180 is preferred.

The preferred initial set up of the alternate control system is to use the adjustment nuts 267 to position the guides 262 in contact with or with a very small clearance (on the order of 0.015) to the flanges 265. This locks in a preset known position for the neutral biasing system 260. At this time the adjustable ball 176 between the lower end of the control rods 170 and the bell cranks 190 are adjusted and/or the length of the power unit rods 195 are adjusted in order to preset the power unit in a corresponding neutral position. This locks in the neutral relationship between the neutral biasing system 260 and the power unit such that upon release of the control levers 180, the power unit will be pulled back into a neutral position by the neutral biasing system 260 (it is preferred that the adjustable ball 176 be adjusted to center the bell crank 190 and then the rods 195 be adjusted for neutral of the power units 50. This allows for a symmetry of force and travel between both sides). The last step of adjustment is at the top 175 of the control rods in a manner identical to the preferred embodiment.

An additional example of a change would be to substitute a steering wheel for the controls 180 by having its rotational axis located between the ball joints 175 (shown in representation form as 300 in FIG. 7). Further the controls 185 could be dispensed with the controls connected to an extension of the bell cranks 190 on thereafter so as to create a single ended device (shown in representational form as 301 in FIG. 7). The neutral biasing system could even be used with its position altered relative to the power unit. Therefore, it is to be realized that modifications may be made without deviating from the claimed invention.

What is claimed:

1. A grounds care device comprising:
    a frame;
    a first wheel operatively connected to said frame;
    a first final ratio drive for providing speed reduction to said first wheel;
    a first power unit operatively mounted to said frame and having an adjustable neutral position, said first power unit for use in providing rotative power to said first final ratio drive; and,
    a control system that includes,
        a control frame operatively connected to said frame;
        a first control rod having first and second ends;
        mounting means for movably mounting said first control rod to said control frame;
        a first control lever operatively connected to said first end of said first control rod for use in selectively moving said first control rod;
        a neutral biasing system including a first cylinder having a first end with a first pivot point operatively mounted to said control frame and a second end with a second pivot point operatively mounted to said first control rod, said first cylinder having a neutral position with respect to said control frame;
        a first power rod that operatively connects said second end of said first control rod to said first power unit; and,
        adjusting means for adjusting said first power unit into said adjustable neutral position in a manner to substantially coincide with said neutral position of said first cylinder.

2. The grounds care device of claim 1 wherein said control system further comprises:
    dampening means for dampening movement of said first control rod.

3. The grounds care device of claim 2 wherein said first cylinder comprises:
    a bi-directional piston within said cylinder, said piston providing said dampening means; and,
    a neutral biasing spring that co-centrically surrounds said piston, said spring biasing said piston into a known centered location.

4. The grounds care device of claim 1 wherein said first power unit is positioned remote from said control frame.

5. The grounds care device of claim 1 wherein said first pivot point has a first axis and said second pivot point has a second axis, said first axis being spaced substantially 90° from said second axis.

6. The grounds care device of claim 1 wherein said adjusting means for adjusting said first power unit into said adjustable neutral position comprises:
    a first adjustable ball joint that operatively connects said second end of said first control rod to a bell crank;
    a second adjustable ball joint that operatively connects said bell crank to said first power rod; and,
    a third adjustable ball joint that operatively connects said first end of said first control rod to said first control lever.

7. A grounds care device comprising:
    a frame;
    an engine operatively mounted to said frame;
    first and second wheels operatively mounted to said frame;
    first and second power units operatively mounted to said frame and each having an adjustable neutral position, said first and second power units for use in driving said first and second wheels respectively, said first and second power units being driven by said engine; and,
    a control system that includes,
        a control frame operatively connected to said frame;
        first and second control rods each having first and second ends;
        mounting means for movably mounting said first and second control rods to said control frame;
        first and second control levers operatively connected to said first ends of said first and second control rods respectively for use in selectively moving said first and second control rods;
        a neutral biasing system including first and second cylinders each having first ends with first pivot points operatively mounted to said control frame and second ends with second pivot points operatively mounted to said first and second control rods respectively, said first and second cylinders each having a neutral position with respect to said control frame, said first and second cylinders being laterally spaced substantially parallel to said first and second control rods respectively;
        first and second power rods that operatively connect said second ends of said first and second control rods to said first and second power units respectively; and,
        adjusting means for adjusting said first and second power units into said adjustable neutral positions in a manner to substantially coincide with said neutral positions of said first and second cylinders.

8. The grounds care device of claim 7 wherein said control system further comprises:

dampening means for dampening movement of said first and second control rods.

9. The grounds care device of claim 8 wherein said first pivot points have first axes and said second pivot points has second axes, said first axes being spaced substantially 90° from said second axes respectively.

10. The grounds care device of claim 9 wherein said adjusting means for adjusting said first and second power units into said adjustable neutral positions comprises:

a pair of first adjustable ball joints that operatively connect said second ends of said first and second control rods to first and second bell cranks respectively;

a pair of second adjustable ball joints that operatively connect said first and second bell cranks to said first and second power rods respectively; and, a pair of third adjustable ball joints that operatively connect said first ends of said first and second control rods to said first and second control levers respectively.

11. The grounds care device of claim 10 wherein said control frame is substantially U shaped comprising:

first and second side plates, said mounting means for movably mounting said first and second control rods to said control frame, including two pivots mounted to said first side plate and two pivots mounted to said second side plate; and, a front surface, said first pivot points of said first ends of said first and second cylinders being operatively mounted to said front surface.

12. The grounds care device of claim 11 further comprising:

first and second final ratio drives that provide speed reduction to said first and second wheels respectively, said first and second power units providing rotative power to said first and second final ratio drives respectively.

13. The grounds care device of claim 12 wherein said engine drives said first and second power units with a single drive belt.

14. A method of adjusting the neutral position of a drive system on a grounds care device that has a frame, a first wheel operatively connected to said frame, a first power unit operatively mounted to said frame and having an adjustable neutral position, said first power unit for use in driving said first wheel, the grounds care device also having a control system that includes a control frame operatively connected to said frame, a first control rod having first and second ends, mounting means for movably mounting said first control rod to said control frame, a first control lever operatively connected to said first end of said first control rod for use in selectively moving said first control rod, and a neutral biasing system, said neutral biasing system including a first cylinder having a first end with a first pivot point operatively mounted to said control frame and a second end with a second pivot point operatively mounted to said first control rod, said first cylinder having a neutral position with respect to said control frame, the control system also including a first power rod that operatively connects said second end of said first control rod to said first power unit, the method comprising the steps of:

centering a bell crank that is adjustably connected to said second end of said first control rod;

fastening said bell crank into a pivotable connection with respect to said control frame;

adjusting the length of said first power rod that is adjustably connected to said bell crank; and, adjusting said first control lever with respect to said first end of said first control rod.

15. The method of claim 14 wherein, the step of centering a bell crank that is adjustably connected to said second end of said first control rod, includes the step of adjusting a first ball joint, the step of adjusting the length of said first power rod that is adjustably connected to said bell crank, includes the step of adjusting a second ball joint, and the step of adjusting said first control lever with respect to said first end of said first control rod includes the step of adjusting a third ball joint.

* * * * *